May 8, 1923.
J. G. JONES
1,454,815
PHOTOGRAPHIC CARTRIDGE
Filed July 25, 1921
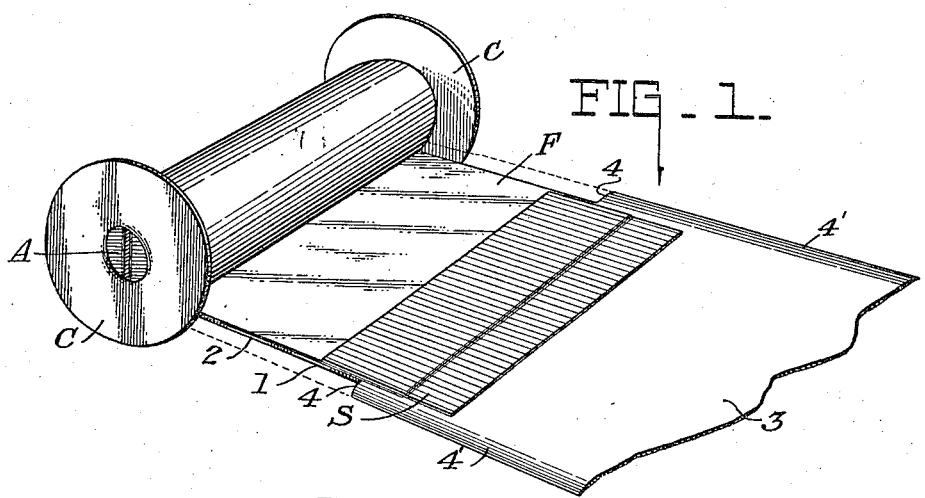
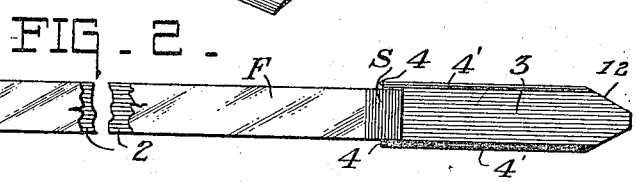
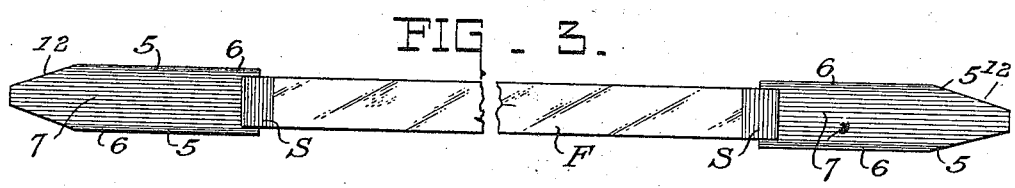
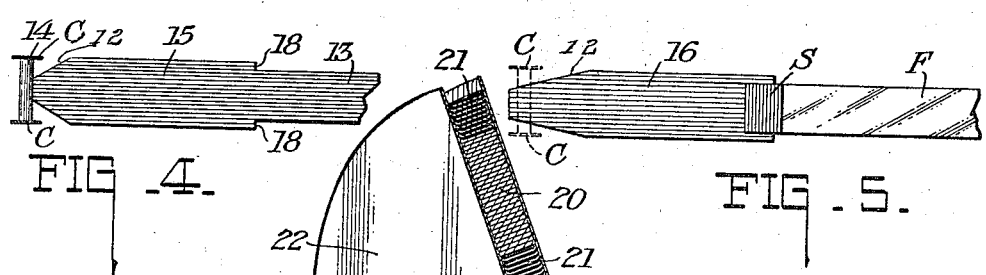
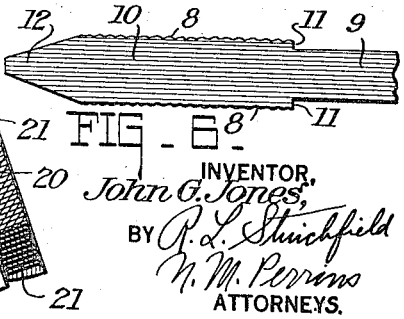

Patented May 8, 1923.

1,454,815

UNITED STATES PATENT OFFICE.

JOHN G. JONES, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CARTRIDGE.

Application filed July 25, 1921. Serial No. 487,450.

*To all whom it may concern:*

Be it known that I, JOHN G. JONES, a citizen of the United States of America, residing at Rochester, in the county of Monroe and State of New York, have invented certain new and useful Improvements in Photographic Cartridges, of which the following is a full, clear, and exact specification.

This invention relates to photographic roll film cartridges of the type commonly used in cameras and comprising a roll of film and protective paper therefor.

More particularly this invention has for its object the elimination of the fault commonly known as edge fog, which results from the undesired leaking of light into the margin or border of a roll film. In my co-pending application, Serial No. 487,447, filed July 25, 1921, I have disclosed the use of a protective paper which, even though wider than the distance between the flanges, is adapted to buckle or be compressed upon itself, thus forming light locks at the ends of the spool. In my other co-pending applications, Serial Nos. 487,448 and 487,449, filed July 25, 1921, I have shown and claimed certain modified alternative methods of attaining this end.

This application relates in part to certain modifications embodying the features shown and claimed in the above applications.

I have discovered that, if the end strips only are made very slightly wider than the distance between the flanges while the film and intermediate portion, if any, of the protective material is made narrower than the end flanges, the end strips may be wound upon the spool without excessive binding, and that they operate to form seals preventing the leaking of light between the edges of the coiled material and the flanges. I find it also desirable, however, to render these end strips flexible or laterally compressible. It is obvious that this end may be attained in a large number of ways, and I have illustrated it in certain ways which are more fully described and are broadly claimed in the applications referred to.

This application is directed to film cartridges having the end strips only wider than the flanges, the rest of the material being narrower, and further to any form of film cartridge comprising a coiled sensitive material with a protective band in which only the leader strips or the protective band coiled around the outside of the film is made of different flexibility at different points in its width.

It is obvious that numerous modifications embodying the principles above described are possible, and I consider all of these as comprised within the scope of my invention as defined in the appended claims. Certain illustrative forms will be specifically described, these being shown in the figures of the drawing to which reference will now be made. Those parts which are the same in the various figures bear the same reference characters in each.

Fig. 1 is a perspective view of a partially unwound film cartridge, the leader strip being broken away;

Fig. 2 is an elevation of the same type of cartridge with the film and paper fully unwound, being broken in the middle to show a part of the backing paper;

Fig. 3 is an elevation of a strip of film having only lead strips;

Fig. 4 is an elevation of an end only of a backing paper with the lead strip only wider than the spool;

Fig. 5 is an elevation of one end of a strip of film having a lead strip attached thereto, the latter being wider than the spool;

Fig. 6 is an elevation of one end only of a modified form of backing paper;

Fig. 7 is a perspective view of a motion picture reel having wound thereon motion picture film with lead strips at the end, the whole being cut to show the section.

It is to be understood that the figures are not drawn to scale, but are so proportioned as best to illustrate the features of the invention.

Upon a film spool of ordinary character comprising a core A and metallic end flanges C are interwound a strip of film F and a piece of backing paper 1, the latter being longer than the film which is attached thereto by the usual sticker S. That portion of the backing paper 2 which is opposite the film is of the same width as the film, both of these being of a width not greater than, and preferably slightly less than, the distance between the flanges C of the spool upon which they are wound. The end portions or leader strips 3 of the backing paper are wider than the intermediate portion thereof and than the distance between the end flanges, there being shoulders or abutments 4 at the inner ends of the leader strips. The opposite edges of the lead strips are cut, abraded, skived or thinned in any other way to form beveled or chamfered margins 4' which increase in thickness inwardly from the extreme edge, where they are very thin, flexible and substantially straight.

The margins, however, may be uniformly thinner than the median or body portion of the protective paper, this being illustrated in Fig. 3 in which there is shown at 5 the slight abutment between the uniformly thinner margins 6 and the median portion 7. In this figure the film F is shown as attached to lead strips only by ordinary stickers S, there being no backing paper running the length of the film.

In Fig. 6 the greater flexibility and decreased volume at the margin is obtained by serrating the edges, as shown at 8. In this figure the intermediate portion 9 is shown as of reduced width, and the end strip 10 only is wide, there being slight abutments or shoulders 11 at its inner end. In all of the figures the extreme outer end of the lead strip is narrowed as at 12, this being the usual construction.

In Fig. 4 I have shown one end of a backing strip, the intermediate portion 13 of which is narrower than the width of the spool 14 with which it is to be used, and the end strip 15 only is wider than the distance between the flanges of this spool, there being slight abutments 18 at the inner end of the lead strip. In this form the edges are straight and of uniform thickness.

Fig. 5 is illustrative of the type in which the film F has lead strips only, the lead strip 16 in this case, as in Fig. 4, being wider than the distance between the flanges C of the spool with which it is to be used and having straight edges of uniform thickness.

In Fig. 7 is shown a coil of motion picture film 20 having at each end thereof lead strips 21 with thin edges, these being coiled upon the usual type of reel 22 used in motion picture cameras.

It is to be understood that while the different modified forms that I have described and suggested and others which are their equivalents come within the scope of my invention as claimed, these different forms naturally vary in their practicability and in their peculiar advantages and disadvantages, some being better adapted for manufacture than others and some more efficient for the described and intended purposes.

Having thus described my invention, what I claim as new and desire to secure by Letters Patent is:

1. A photographic film cartridge comprising a spool with spaced end flanges having flat inner facing surfaces, strip material, comprising photographically sensitive material and protective material, wound on said spool and including lead strips of protective material, said lead strips only being wider than the distance between said flanges and the rest of said strip material being narrower than such distance.

2. A photographic film cartridge comprising a spool with spaced end flanges, a band of photographic film and a band of protective material interwound thereon, said protective band being longer than said film band and the end portions thereof constituting lead strips for the film, said end portions being wider than the intermediate portion of the protective band and also wider than the distance between the flanges.

3. In a photographic film cartridge, spirally coiled strip material comprising photographically sensitive material and protective material, and including lead strips of protective material, said lead strips only being of different flexibility at different portions of their width, and said lead strips being wider than any other portion of the strip material.

4. In a photographic film cartridge, spirally coiled strip material, comprising light sensitive material and protective material, and including lead strips of protective material, said lead strips only having their side margins of less volume and greater flexibility than their median portions, said lead strips being wider than any other portion of the strip material, and a support therefor comprising end flanges.

5. A photographic film cartridge comprising a spool with spaced end flanges, strip material, comprising photographically sensitive material and protective material, wound on said spool and including lead strips of protective material, said lead strips only being wider than the distance between the flanges and having margins of greater flexibility than their median portions, the rest of the strip material being narrower than the distance between the flanges.

6. A photographic film cartridge comprising a spool with spaced end flanges, a band of photographic film and a band of protective material interwound thereon, said protective band being longer than said film band and its ends constituting lead strips, said lead strips being wider than the intermediate portions of the protective band, and the end strips being thinner at their side margins than at their median portions.

7. A photographic film cartridge comprising a spool with spaced end flanges, a band of photographic film and a band of protective paper interwound thereon, the protective band being longer than said film band and attached thereto, and the end portions of the paper band constituting lead strips, said lead strips being of different thickness at different points in their widths and wider than the distance between the flanges, that portion of the protective paper between the end portions being narrower than the distance between the flanges.

8. A photographic film cartridge comprising a spool with spaced end flanges, a band of photographic film and a band of protective paper interwound thereon, the protective band being longer than said film band and attached thereto, and the end portions of the paper band constituting lead strips, the said lead strips having beveled side edges, and being wider than the intermediate portion of the backing paper and also wider than the distance between the flanges.

Signed at Rochester, New York, this 21st day of July, 1921.

JOHN G. JONES.